May 17, 1960
J. R. LAUZELY ET AL
2,936,580
APPARATUS FOR THE VARIATION OF AN AIR-INLET
OF A REACTOR OR A GAS TURBINE ENGINE
Filed Sept. 17, 1957
2 Sheets-Sheet 1
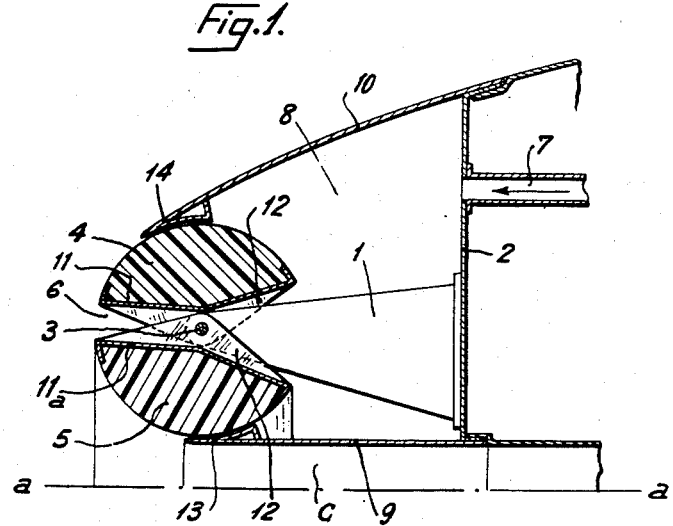
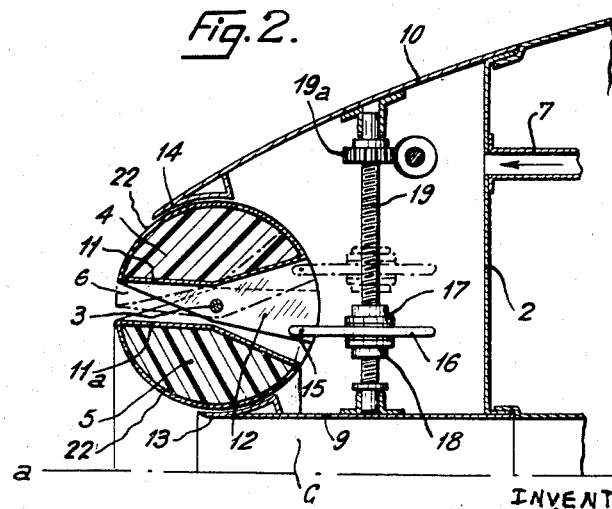
INVENTOR
JEAN RENÉ LAUZELY
KLÉBER TOURÉ
Watson, Cole, Grindle & Watson
ATTORNEYS

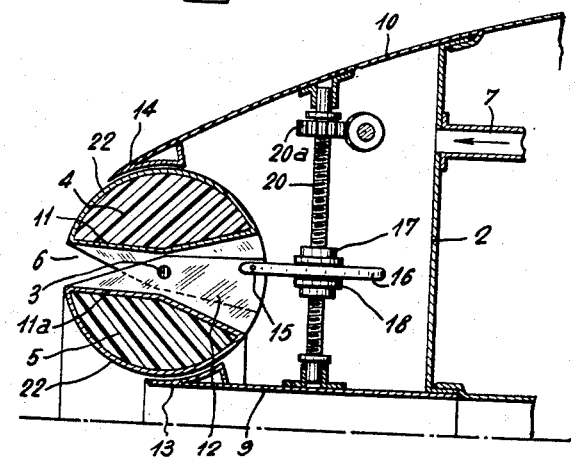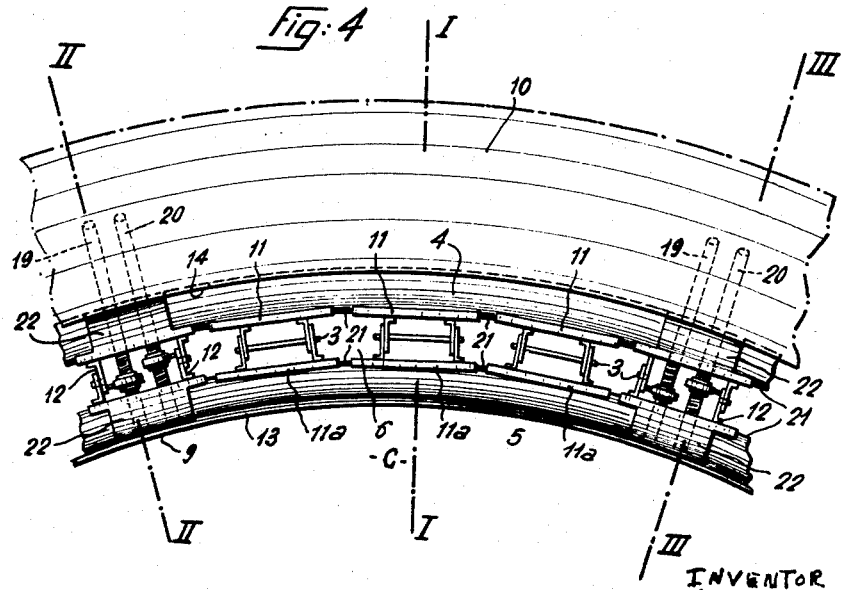

United States Patent Office 2,936,580
Patented May 17, 1960

2,936,580

APPARATUS FOR THE VARIATION OF AN AIR-INLET OF A REACTOR OR A GAS TURBINE ENGINE

Jean René Lauzely, Dammarie-les-Lys, and Kléber Touré, Paris, France, assignors to Societe Nationale d'Etude et de Construction de Moteurs d'Aviation, Paris, France Application September 17, 1957, Serial No. 684,596

Claims priority, application France October 1, 1956

2 Claims. (Cl. 60—35.6)

The requirements of flight at high speeds and particularly the maximum recovery of the dynamic pressure, and above all the production of the maximum effective thrust on the reactor from a zero speed of the propelled apparatus up to its maximum speed (permitting of substantial reductions in the specific consumption, and therefore an appreciable increase in the radius of action for a given load of fuel) have led to the design of devices such as described in our Patent application Serial No. 357,332 filed on May 25, 1953, now Patent No. 2,864,236 which enable the intake conduit of the reactor to be adapted to various conditions of speed and of altitude.

These devices comprise one or a number of orifices combined with the wall of the air inlet and coupled to a source of auxiliary fluid at a suitable pressure, the said orifices being arranged and directed in such manner that this auxiliary fluid which is discharged from them flows against the wall of the air inlet and is interposed between that wall and the flow of atmospheric air.

The present invention has for its object an improvement in these devices with a view to obtaining a better adaptation of the air inlet to the conditions of speed and altitude from zero speed at zero altitude up to high altitudes and supersonic speeds.

In accordance with this improvement, at least one of the edges of the orifice or orifices which serve to discharge a jet of auxiliary fluid is movable with respect to the other edge, in such manner that it is possible to vary the outlet section of the said orifice.

The latter is preferably formed between two walls, one of which is movable in rotation with respect to the other so that the variation of the outlet section may thus be accompanied by a variation of the mean direction of flow of the auxiliary jet between the two walls.

Preferably also, the two walls are movable in rotation independently of each other, in order that the above-mentioned variation of the mean direction of flow may be effected symmetrically in one direction or in the other, that is to say either towards the axis of the air-inlet conduit of the reactor or diverging from the said axis. Simultaneous rotation of the two walls, modifying simply the mean direction but not the section of passage of the auxiliary jet remains possible however, and this increases the range of the regulation.

The device thus improved enables the leading edges or lips of the air-admission nozzle of the reactor to be modified or the effects of the incident flow on these edges to be varied, in order to reduce the internal or external drag of the reactor, and when so required, to determine the positions and characteristics of the shockwave.

The description which follows below with reference to the accompanying drawings (which are given by way of example only and not in any sense by way of limitation) will make it quite clear how the invention may be carried into effect, the special features which are brought out, either in the text or in the drawings, being understood to form a part of the said invention.

Figs. 1, 2 and 3 show diagrammatically half cross-sections of the leading edge of the air-inlet nozzle of the reactor and of the improved device, the sections being made through planes passing through the axis of the air-inlet nozzle, and the outlines of which are the lines I—I, II—II and III—III of Fig. 4.

Fig. 4 is an end view of a segment of the leading edge of the air-inlet nozzle and of the improved device.

These four figures show the device in one single position only.

A certain number of supports 1 in the form of a fork are fixed to the annular partition 2 which passes all round the air-inlet opening C, the axis of which, parallel to the line $a$—$a'$ is lower than this line in the plane of Fig. 1. (In Fig. 4, this axis is at the intersection of the planes I—I, II—II and III—III.) The arms of each support 1 carry a shaft 3 around which are movable, on the one hand an upper section 11 and on the other hand a lower section 11a, the said sections being provided with flanges 12 which are pivoted on the shafts 3. The space provided between the upstream edges of the said segments of a cylinder forms the opening of the slot 6 which serves to eject towards the upstream side the annular jet of air or of another fluid, intended to increase or to reduce the intake section at the front of the air-inlet nozzle.

The continuity of the slot 6 together with fluid-tightness along the edges 13 and 14 of the interior and exterior linings 9 and 10 of the leading edge are ensured by means of rolls 4 and 5 of elastic material which are fixed on the sections 11 and 11a. Each of these rolls covers the whole of a segment of the annular slot, preferably extending from one pair of operating rods 19 and 20, reference to which will be made later, to the following pair (see Fig. 4).

The coupling between the rolls of the different segments at the point of the operating rods is effected by means of metal sleeves 22 shaped to the form of the section of the elastic rolls which they draw-out when the circumference increases during the rotation of the sections 11 and 11a, and which they allow to return to their original position when the circulation is reduced.

By their movement around the shafts 3, the sections 11 and 11a and the rolls 4 and 5 which they carry determine the dimensions of the slot 6 whilst at the same time the outer rounded faces of the rolls ensure the fluid-tightness of the compartment 8 by co-operating with the edges 13 and 14 of the coverings 9 and 10 of the leading edge.

Compressed air or gas obtained from any portion whatever of the reactor are brought in through one or a number of intake conduits 7 to the compartment 8 which is formed by the rolls 4 and 5, by the partition 2 and by the inner and outer coverings 9 and 10.

Fig. 2 shows diagrammatically by way of example, the part of the device for varying the opening which controls the movement of the upper roll 4.

In the plane of this figure, one of the support-flanges 12 of the section 11 is slightly extended (avoiding however any premature contact with the lower section 11a preventing total closure), in order to permit of the free fixing of a shaft 15 which is enclosed in the housing provided for that purpose on the rod 16. The latter is of circular section and slides freely in the socket 17 which is rigidly fixed to the threaded sleeve 18, thus preventing this sleeve from effecting any movement of rotation about the threaded rod 19 when a movement of rotation is impressed on this rod, the said sleeve being then forced to move upwards or downwards along the threaded rod 19, depending on the positive or negative direction of rotation of the said rod.

The movement of rotation of the threaded rod 19 may be obtained either by the action of a rack on a pinion 19a fixed on the said rod, in the case in which the control is effected by the longitudinal movement of translation of a member of a servo-control, or by the engagement of an endless screw with a similar pinion when the control is effected by a rotating member, or by any other means, electric, hydraulic, pneumatic or mechanical, the form of operation itself not forming a part of the present invention.

Fig. 3 shows diagrammatically the part of the device for variation of opening which controls the movement of the lower roll 5. This device comprising the threaded operating rod 20 acting on the support-flange 12 of the section 11a, is similar to that described with respect to Fig. 2 and operates in a similar way.

When a rotational operation in the positive direction is applied to the threaded rods 19, each of these rods screws into a threaded sleeve 18 which has the effect of displacing this sleeve towards the outer covering 10 of the inlet nozzle carrying the rod 16 with it in its movement. The latter drives the shaft 15 and thus impresses a movement of rotation on the support-flange 12 of the corresponding section 11, around the shaft 3. The roll 4 thus rotates about the shafts 3 by elastic deformation. The section of the slot 6 is reduced while at the same time its outer edge formed by the sections 11 takes an oblique form directed towards the interior of the air-inlet channel. The annular jet thus contracts and is directed towards the axis of the channel. On the other hand, when a rotational operation in the negative sense is applied to the threaded rods 20, the slot 6 is closed towards the exterior of the channel and the opposite effect is obtained.

If now the two systems of rods are given opposite and equal displacements, the direction of the opening of the slot 6 is simply varied, the cross-section of passage remaining the same.

In addition, there can be provided a system of regulation of the rate of flow and/or of the pressure of the fluid brought in through 7, for example by means of a valve.

It is an advantage to provide a coupling between the adjacent sections. In the form of embodiment shown in Fig. 4, sections 11 and 11a are provided on one side of an extension 21 which is supported by the interior of the adjacent section.

These extensions 21 may also be embedded and anchored in the material of the roll of the next adjacent segment, any movement of the segments resulting then in a tractive or compressive force on the said material, compelling this latter to fill the spaces between the segments.

The fluid used for feeding the slot 6 may be compressed air or any other convenient gas under pressure. However, in certain cases, this fluid may be water or another liquid. This use of a liquid is particularly interesting when a cooling effect is beneficial, in particular at "hypersonic" speeds, i.e. speeds far above ordinary supersonic values, where the "heat barrier" is met. The water will then form a film coating the various surfaces and its evaporation will protect these surfaces from excessive thermal stress.

What we claim is:

1. An aircraft engine having an air-intake casing of the type controlled by means of an orientable auxiliary jet formed at the leading edge of said casing, a device for producing such a jet comprising a socket of arcuate shape having two opposite concave walls centered on a curvilinear axis, two leading-edge parts of arcuate shape, housed in said socket and mounted for rotation about said curvilinear axis, said parts being of an elastically deformable material and having convex outer surfaces fitting said concave walls to form therewith a ball-and-socket assembly and inner surfaces opposite each other to bound a slot-shaped passage, means for varying the angular position of each of said parts about said axis, said means comprising movable mechanical members engaging said parts to elastically deform the same, and means for supplying pressure fluid to said passage.

2. Device as claimed in claim 1, wherein the socket and leading-edge parts are generally tore-shaped and extend around the periphery of the air-intake casing.

References Cited in the file of this patent

UNITED STATES PATENTS

| 2,669,091 | Schutte | Jan. 13, 1951 |
| 2,864,236 | Touré et al. | Dec. 16, 1958 |

(U.S. corresponding to French Patent 1,057,721)

FOREIGN PATENTS

| 14,631 | Great Britain | Sept. 14, 1905 |